US012642387B2

(12) United States Patent
Iemma et al.

(10) Patent No.: US 12,642,387 B2
(45) Date of Patent: Jun. 2, 2026

(54) AUTOMATIC BEVERAGE PREPARATION MACHINE WITH ELECTROMAGNETIC-INDUCTION, CONTINUOUS-FLOW FLUID HEATER

(71) Applicants: HEYLO S.R.L., Bergamo (IT); Umberto Doglioni Majer, Chignolo D'Isola (IT)

(72) Inventors: Lorenzo Iemma, Chignolo d'Isola (IT); Allessandro Ceriani, Chignolo d'Isola (IT); Andrea Doglioni Majer, Chignolo d'Isola (IT)

(73) Assignee: HEYLO S.R.L., Bergamo (IT)

( * ) Notice: Subject to any disclaimer, the term of this patent is extended or adjusted under 35 U.S.C. 154(b) by 740 days.

(21) Appl. No.: 18/001,985

(22) PCT Filed: Jun. 18, 2021

(86) PCT No.: PCT/IB2021/055407
§ 371 (c)(1),
(2) Date: Dec. 15, 2022

(87) PCT Pub. No.: WO2021/255708
PCT Pub. Date: Dec. 23, 2021

(65) Prior Publication Data
US 2023/0225548 A1 Jul. 20, 2023

(30) Foreign Application Priority Data

Jun. 19, 2020 (EP) ..................................... 20181250
Sep. 18, 2020 (IT) ....................... 102020000022039

(51) Int. Cl.
*A47J 31/60* (2006.01)
*A47J 31/54* (2006.01)

(52) U.S. Cl.
CPC ............... *A47J 31/60* (2013.01); *A47J 31/54* (2013.01)

(58) Field of Classification Search
CPC ................................. A47J 31/54; A47J 31/60
See application file for complete search history.

(56) References Cited

U.S. PATENT DOCUMENTS 5,393,540 A * 2/1995 Bunn ...................... A47J 31/40
426/433
10,869,572 B2 * 12/2020 Blatt ...................... A47J 31/407
(Continued)

FOREIGN PATENT DOCUMENTS

WO 2017/191529 A1 11/2017
WO 2017/216015 A1 12/2017

OTHER PUBLICATIONS

International Search Report and Written Opinion dated Oct. 12, 2021 from corresponding International Patent Application No. PCT/IB2021/055407, 12 pages.

*Primary Examiner* — Woody A Lee, Jr.
(74) *Attorney, Agent, or Firm* — Ruggiero McAllister & McMahon LLC

(57) ABSTRACT

In an automatic beverage preparation machine operable to dispense a beverage in a container, a fluid for preparing the beverage is heated by an electromagnetic-induction, continuous-flow heater having a tubular body delimiting a flow path form the fluid to be heated. The tubular body has an end outlet segment leading into a chamber closed by a plug-shaped body that is removable to allow access to the flow path. The plug-shaped body is arranged outside a casing or is uncouplable and extractable from the casing through an opening formed in the casing to allow direct access from the outside to the flow path.

11 Claims, 5 Drawing Sheets

(56)                    References Cited

U.S. PATENT DOCUMENTS

| | | | |
|---|---|---|---|
| 11,202,530 B2 * | 12/2021 | Devlin ................... | A47J 31/60 |
| 11,925,289 B2 * | 3/2024 | Buchholz ............... | A47J 31/52 |
| 2010/0154645 A1 * | 6/2010 | Nosler ................... | A47J 31/40 |
| | | | 99/299 |
| 2014/0060338 A1 * | 3/2014 | Tembaak ............... | A47J 31/60 |
| | | | 137/15.05 |
| 2016/0184830 A1 * | 6/2016 | Misumi ................... | B02C 7/12 |
| | | | 241/261.2 |
| 2018/0193807 A1 | 7/2018 | Jarisch et al. | |

* cited by examiner

AUTOMATIC BEVERAGE PREPARATION MACHINE WITH ELECTROMAGNETIC-INDUCTION, CONTINUOUS-FLOW FLUID HEATER

CROSS-REFERENCE TO RELATED APPLICATIONS

This application is a national stage application, filed under 35 U.S.C. § 371, of International Patent Application No. PCT/IB2021/055407, filed on Jun. 18, 2021, which claims priority to European patent application no. 20181250.0 filed on Jun. 19, 2020, and Italian patent application no. 102020000022039 filed on Sep. 18, 2020, the disclosures of all of which are incorporated herein by reference.

BACKGROUND OF THE DISCLOSURE

1. Field of the Disclosure

The present disclosure relates in general to the field of automatic beverage preparation machines and, in particular, to either table-top or free standing automatic beverage preparation machines provided with electromagnetic-induction, continuous-flow fluid heaters.

2. Description of Related Art

Automatic beverage preparation machines are known for preparing beverages, in general, and hot beverages, in particular, which are obtained by heating a fluid product which can be a liquid such as, for example, water for the preparation of coffee, tea, etc., or milk in all its types or milk-based mixtures for the preparation of hot milk, cappuccino, etc., or even gaseous such as, for example, air or gaseous mixtures used, for example, as a heating means for heating components used for the preparation of the beverages.

For this purpose, the known automatic beverage preparation machines are provided with a fluid product heater, which usually is in the form of either a storage heater (boilers, kettles) or a continuous-flow or through-flow heater.

The continuous-flow fluid heaters operate according to two different technologies: resistive heating, which is very common in the field, and electromagnetic-induction heating, which is less common in the field with respect to the former.

In the first technology, an electrical potential difference is applied to opposite ends of an heating element, which is directly or indirectly flown by the flow of fluid to be heated. An electric current is then generated in the heating element which, by Joule effect, dissipates energy in the form of heat, heating the fluid by conduction.

Two embodiments of this first technology are disclosed in EP 2 044 869 A1.

In the second technology, the fluid is heated using electromagnetic-induction to generate eddy currents within a duct to be heated in which a fluid is caused to flow.

The duct can form a nearly straight flow path when it is formed by a single tubular body made of electrically conducting material. The eddy currents dissipate energy, by Joule effect, in the form of heat, thereby heating the fluid flowing in the duct.

Alternatively, the duct can form a "twisting" and, generally, a helical flow path. In this case, an insert is housed inside the tubular body and forms, along with the tubular body, the helical flow path.

An electromagnetic-induction, continuous-flow fluid heater with a helical flow path is disclosed in Italian patent application No. 102019000007166 and in the corresponding international application No. PCT/IB2020/052950, both in the name of the present Applicant.

In the aforementioned patent applications, the electromagnetic-induction, continuous-flow fluid heater is intended to heat water and the electromagnetic induction is generated by means of an electromagnetic-induction winding wound just around the tubular body.

In a different embodiment, the electromagnetic induction is generated by wounding the induction winding around, but at a distance from, the tubular body.

In other embodiments, the electromagnetic induction is generated by associating the induction winding with the insert.

A different electromagnetic-induction, continuous-flow water heater in an automatic beverage preparation machine is disclosed in international applications WO 2015/063572A1 and WO 2017/191529 A1. The water heater comprises a metal heating duct and an electrical induction winding, the coils of which are wound around a spool made of electrically insulating material and having an inner cavity in which the metal duct is housed. The metal duct and the spool are at least partially separated by a gap inside the cavity to allow the separate maintenance of the metal duct and the electrical winding.

In the course of experiments and tests, the Applicant has experienced the particular efficacy of the electromagnetic-induction, continuous-flow water heater which is the object of his Italian patent application No. 102019000007166 and international patent application No. PCT/IB2020/052950 for heating liquids containing fatty substances, and in particular liquid milk used in the preparation of beverages predominantly based on milk, such as hot milk and latte macchiato, and hot beverages produced by brewing brewable substances with pressurised hot water, such as coffee and tea beverages, and also containing liquid milk, hot or cold, frothed or unfrothed, for example espresso macchiato, cappuccino, etc.

In particular, the Applicant has ascertained that this particular efficiency derives from the fact that the water heater manages to heat the liquid milk without burning the fats contained therein, thus maintaining the organoleptic properties thereof unaltered.

The Applicant has also verified how such a water heater was able to effectively heat any type of liquid milk of natural origin, of artificial origin, of animal origin (cow, goat, sheep, donkey, buffalo, etc.), of vegetable origin, raw, fresh, pasteurised, whole, partially or totally skimmed, UHT, lactose-free, highly digestible, etc., as well as any other type of milk.

The electromagnetic-induction, continuous-flow fluid heater for heating liquid substances or mixtures containing fatty substances is the object of the Italian patent application No. IT 102020000014692 and of the corresponding International application No. PCT/IB2021/051201, both of which are in the name of the present Applicant.

In the end, the Applicant has also ascertained the effectiveness of the water heater which is the object of his Italian patent application No. 102019000007166 and of the International application No. PCT/IB2020/052950 for heating other types of fluids used in automatic beverage preparation machines, for example gases or gaseous mixtures, in particular air used for foaming milk, or for post-heating beverages already produced, where the temperature thereof is not satisfactory or the user needs to have it at a different temperature from that envisaged.

Experimentation carried out by the Applicant lies, to a large extent, in the fact that electromagnetic-induction, continuous-flow fluid heaters are particularly advantageous in that they allow the fluid to be heated in a short time.

Different fluid heaters in fluid foaming machines, in particular milk foaming machines, are disclosed in US 2018/193807 A1 and WO 2017/216015.

SUMMARY OF THE DISCLOSURE

The above-described electromagnetic-induction, continuous-flow fluid heaters represent a functionally valid solution for heating fluids in general in automatic hot beverage preparation machines.

However, the Applicant has ascertained that an efficient heating is subject to careful and daily cleaning of the duct in which the fluid is caused to flow and periodical replacement of some components of the filter, on the one hand, but that these cleaning/replacement operations are extremely difficult and require relatively long intervention times, on the other hand.

This is due to the fact that known heaters, although openable or disassemblable to allow the path of the fluid flow to be accessed, are in fact housed inside a casing of the automatic beverage preparation machine in positions which are difficult to reach and such that the cleaning of the same heaters and/or the replacement thereof, when necessary, is subordinate to the disassembly of parts of the casing. Reverse operations are of course then necessary for the recommissioning after maintenance/replacement.

In some cases, the disassembly of the casing is not immediate and easy because the casings, sometimes also for aesthetic reasons, consist of half-shells or parts, even of complex geometry, which are connected together by means of "hidden" screws or bolts and therefore not immediately accessible.

In some cases, the maintenance of the heaters even requires the automatic beverage preparation machine to be tilted or completely overturned, forcing the maintenance technician to work in uncomfortable conditions, also to avoid the leakage of liquid following the opening of the heater or the decoupling of the heater from the hydraulic or pneumatic circuit inside the automatic beverage preparation machine.

It is clear that such operations are both time-consuming and require relatively large support/maneuvering spaces, which are not normally available in the areas where automatic beverage preparation machines are located.

The object of the present disclosure is to provide an automatic beverage preparation machine with electromagnetic-induction, continuous-flow fluid heaters, the design features of which allow to solve the above-mentioned problems in a simple and economical manner and, in particular, allow immediate access to the heater and permit an easy maintenance thereof.

According to the present disclosure, an automatic beverage preparation machine with an electromagnetic-induction, continuous-flow fluid heater is provided, as claimed in claim 1.

DETAILED DESCRIPTION OF THE DISCLOSURE

The present disclosure will now be described in detail with reference to the accompanying drawings to enable a skilled person to obtain and use it. Various modifications to the embodiments presented shall be immediately clear to persons skilled in the art and the general principles disclosed herein could be applied to other embodiments and applications but without thereby departing from the scope of protection of the present disclosure as defined in the appended claims. Therefore, the present disclosure should not be considered limited to the embodiments described and shown, but should be granted the widest protective scope in accordance with the features described and claimed.

Where not otherwise defined, all the technical and scientific terms used herein have the same meaning commonly used by persons of ordinary skill in the field pertaining to the present disclosure. In the event of a conflict, this description, including the definitions provided, shall be binding. Furthermore, the examples are provided for illustrative purposes only and as such should not be considered limiting.

The terminology used herein is for the purpose of describing only the preferred embodiment, and is not intended to limit the scope of the present disclosure.

Figure 1:
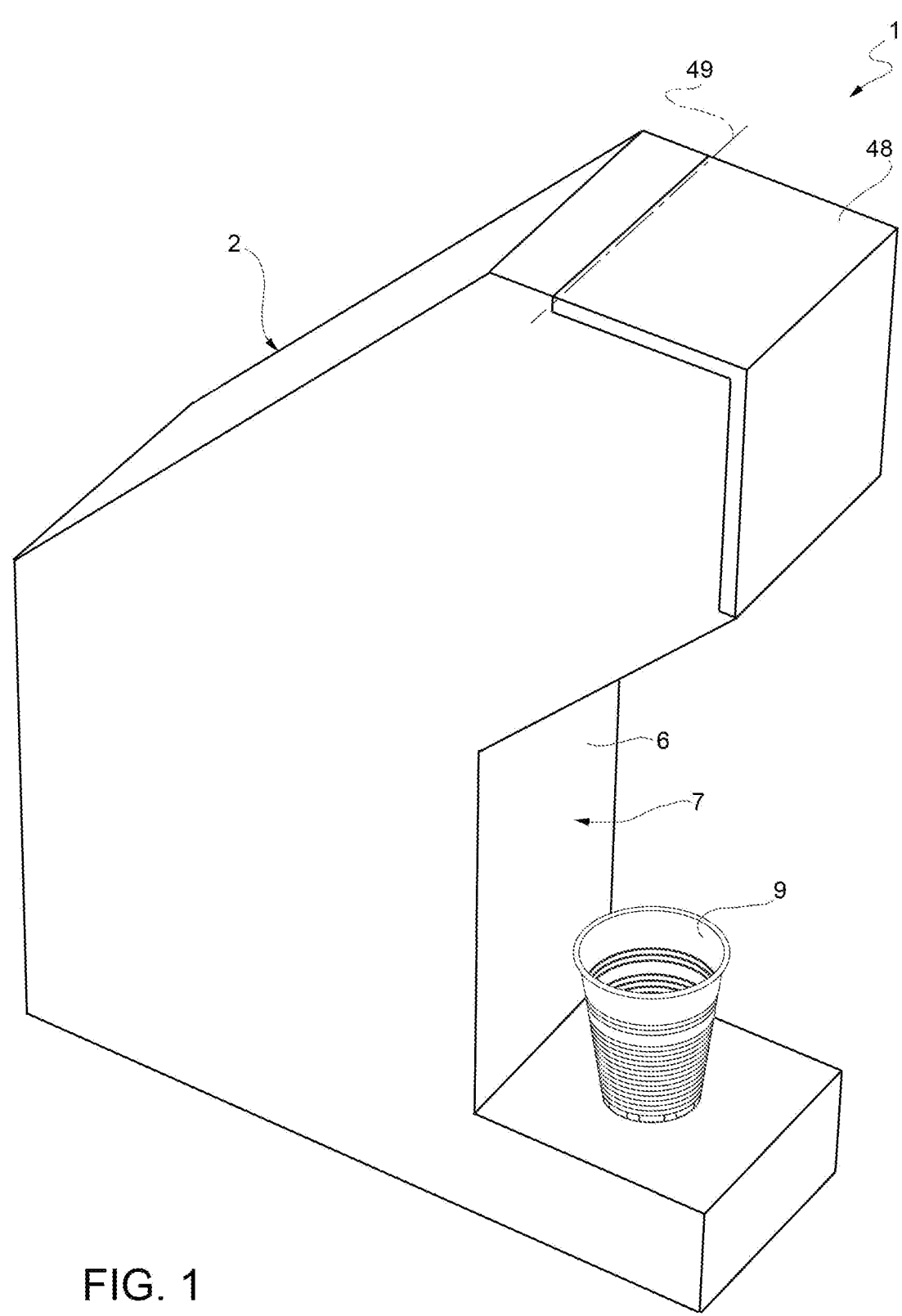
FIG. 1 shows, schematically and in perspective view, a preferred embodiment of an automatic preparation beverage machine according to the present disclosure and in a functional or beverage dispensing configuration.
Figure 2:
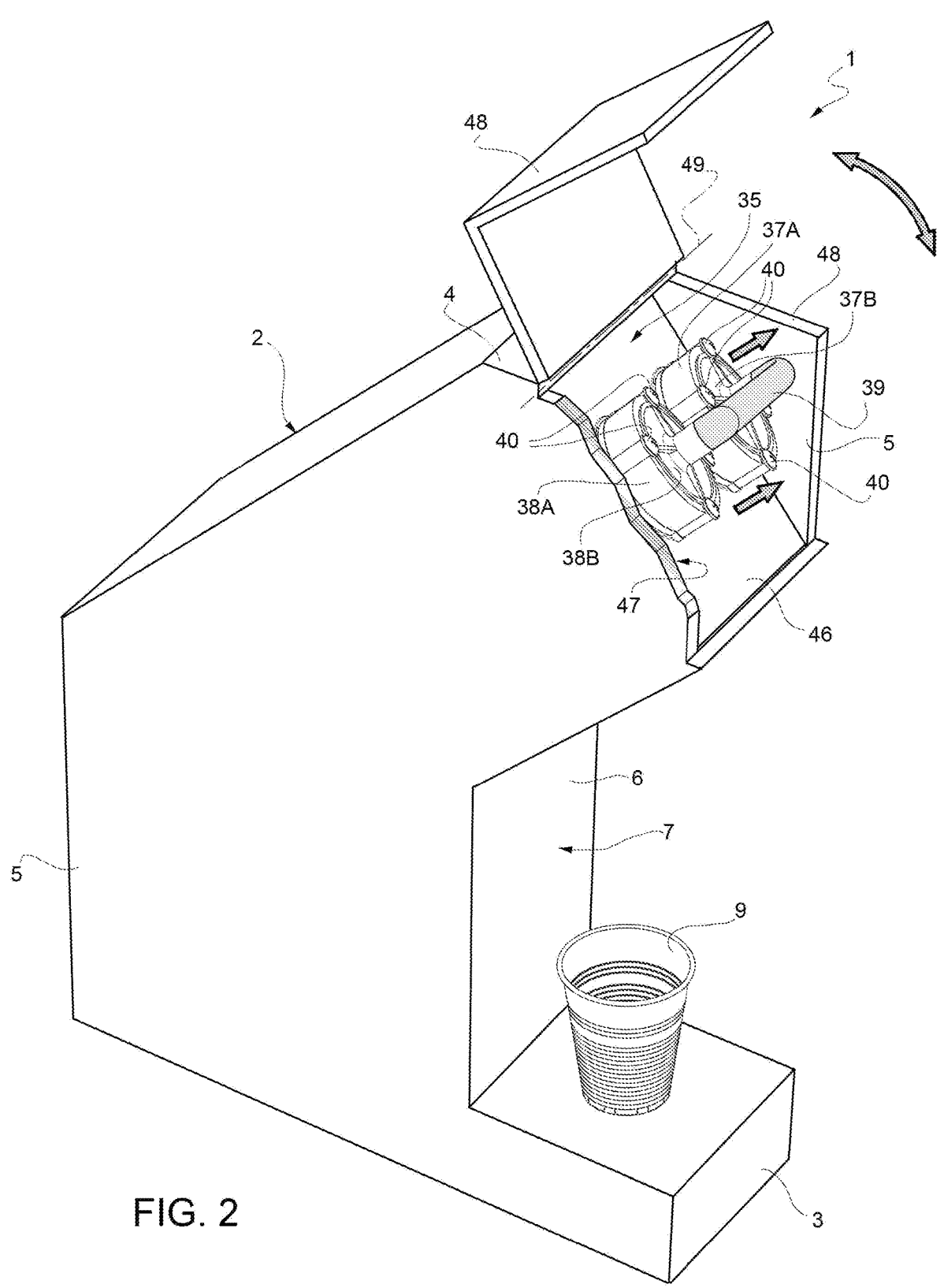
FIG. 2 is similar to FIG. 1 and shows the automatic beverage preparation machine shown in FIG. 1 in a maintenance configuration, and with parts removed for the sake of clarity.

With reference to FIGS. 1 and 2, reference numeral 1 denotes an automatic beverage preparation machine operable to prepare beverages in general, and hot beverages, in particular, starting from a fluid to be heated at a predefined temperature as a function of the type/temperature of the beverage to be prepared and of the chemical-physical and organoleptic features of the fluid to be heated.

Hereinafter the term "fluid" is meant to indicate any liquid product or any liquid mixture, e.g., water or milk, or any heatable gaseous substance or mixture, e.g., air. Air or an equivalent gaseous mixture is used in brewing beverages, such as tea, coffee, etc., or to froth other substances such as natural or artificial liquid milk, etc.

Still with reference to FIG. 1, the automatic beverage preparation machine 1 comprises a casing 2, in turn, comprising a base wall 3, an upper wall 4, two side walls 5, and a front wall 6 facing, in use, a user. The walls 3-6 are firmly mutually connected.

In the example described, the casing 2 has a front recess 7 (FIG. 3) delimited, at the bottom, by a resting surface 8 for a cup 9, into which the beverage is dispensed, and at the top by a wall 8A (FIG. 3) from which a beverage dispenser 10 protrudes to dispense a beverage in a cup 9.

Figure 3:
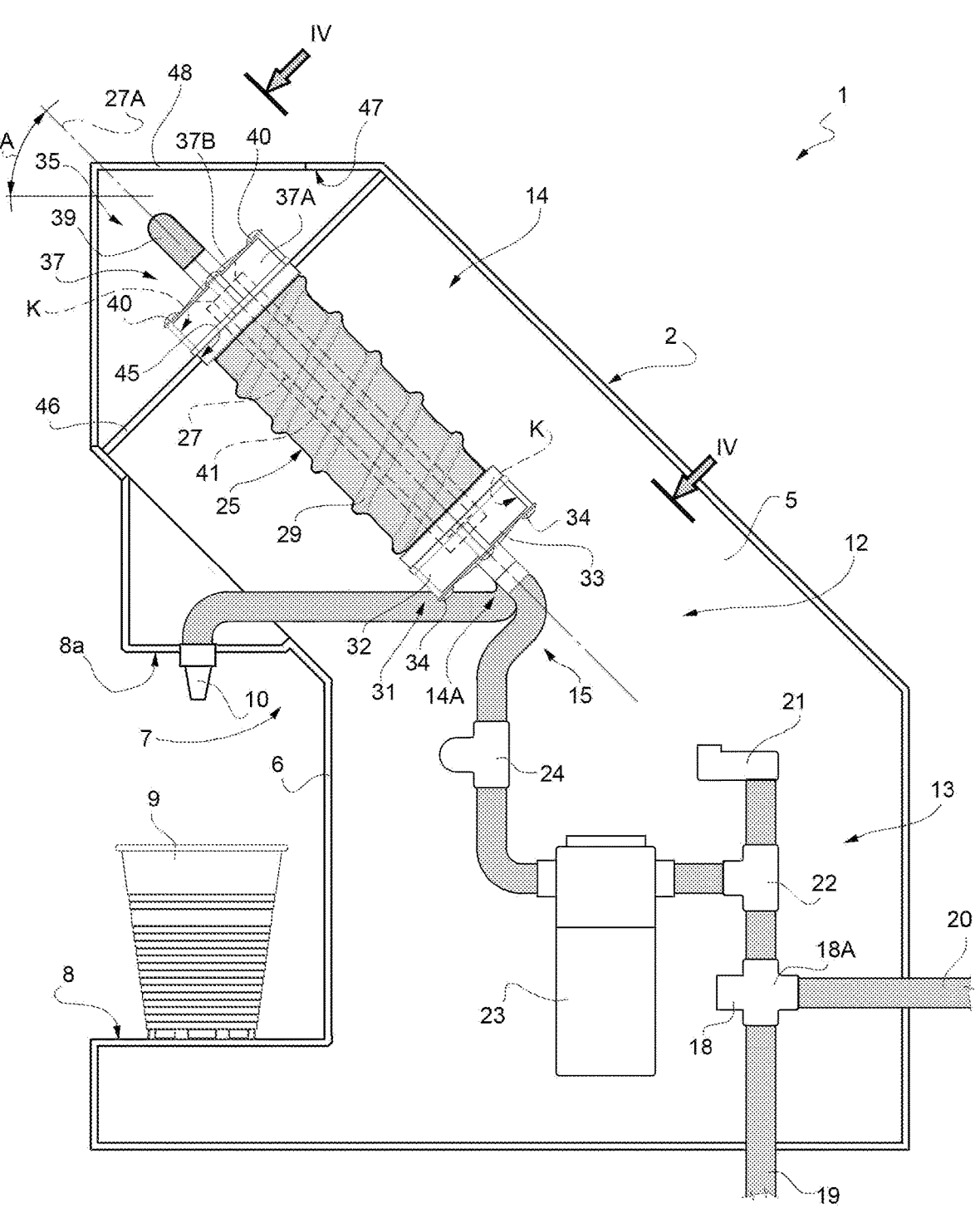
FIG. 3 shows a cross-section of the automatic beverage preparation machine shown in FIG. 1.

With reference to FIG. 3, the casing 2 houses a beverage preparation group 12 for preparing and dispensing beverages by heating fluids, in this case both liquids, for example water or milk, and aeriform, for example air or a mixture of gases.

The beverage preparation group 12 comprises an fluid inlet circuit 13 to receive a fluid to be heated, a heating device 14 to heat the received fluid, and an fluid outlet circuit 15 where a heated fluid is supplied and having a fluid outlet connected to a fluid dispensing nozzle 10.

The heating device 14 is an electromagnetic-induction, continuous-flow fluid heater and has a fluid inlet 14A connected to a fluid outlet of the fluid inlet circuit 13, and a fluid outlet 14B connected to the fluid outlet circuit 15.

The fluid inlet circuit 13 comprises a three-way selection valve 18, which has an inlet port fluidly connected to a water supply duct 19, an inlet port fluidly connected to a liquid supply duct 20 provided to supply a liquid different from water, for example milk or a cleaning liquid, and a fluid outlet 18A where a selected liquid is supplied.

The fluid inlet circuit 13 further comprises a proportional valve 21 operable to control inlet air, and a tubular T-joint 22 with inlets fluidly connected to outlets of the valves 18 and 21, and an outlet fluidly connected to an inlet of the fluid outlet circuit 15 via a rotary pump 23 and a pressure sensor 24, known per se and not described in detail.

Figure 4:
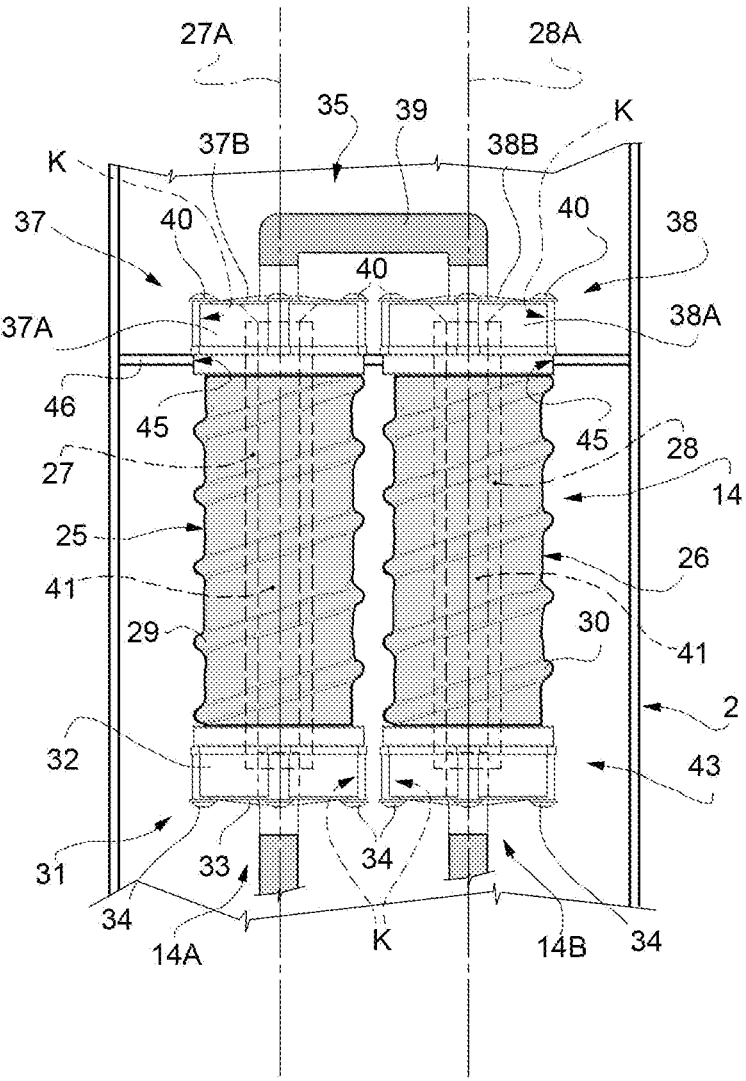
FIG. 4 shows a cross-section along line IV-IV in FIG. 3.

With reference to FIG. 3 and, in particular, FIG. 4, the heating device 14 comprises two heaters 25 and 26 housed in, and firmly coupled to, the casing 2 and arranged mutually in series in a direction of flow of the fluid supplied by the fluid inlet circuit 13.

Conveniently but not necessarily, each heater 25, 26 is of the type described in the Italian patent application No. 102020000014692 filed on 19 Jun. 2020 in the name of the Applicant and which is referred herein and the disclosure of which is incorporated herein in its entirety in respect of the necessary parts.

Conveniently, the two heaters 25 and 26 are constructively identical. Preferably, the two heaters 25 and 26 are arranged side by side, as shown in FIGS. 2 and 4, and are firmly coupled to the casing 2.

In a variant not illustrated, the two heaters 25 and 26 are stacked.

In a variant, the two heaters 25 and 26 are constructively different.

Preferably, the heaters 25, 26 comprise respective tubular bodies 27 and 28 having respective longitudinal axes 27A and 28A. Conveniently, the axes 27A and 28A are mutually parallel and form an angle A with the resting plane 8 (FIG. 3).

In the preferred, non-limiting embodiment described, the tubular bodies 27 and 28 are substantially cylindrical and both axes A are straight.

Regardless of geometry, each tubular body 27, 28 is made of an electrically and magnetically conducting material so as to be heatable by electromagnetic induction by means of an electromagnetic induction field.

The heaters 25 and 26 further comprise respective electrical windings 29, 30 which, in the example described, are wound around the respective tubular body 27, 28 coaxially to the axis A, and are electrically powerable to generate an electromagnetic induction field.

Conveniently, the electrical windings 29 and 30 are controlled independently. Conveniently, the winding 29 is controlled to heat the fluid to a temperature between 5° and 40° C.

The winding 30 is instead controllable to raise the temperature of the fluid supplied by the heater 25 to a temperature for example of 70° C.

In a variant, the electrical windings 29 and 30 are electrically series-connected and controlled together.

Again with reference to FIG. 3, the heater 25 is fluidly connected to the outlet of the duct 13 by means of a fluidic connection device 31. In the example described, the fluidic connection device 31 is of a plug type and comprises a fixed hollow collar 32, inside which a lower end section of the tubular body 27 protrudes, and a closing plug 33 defining a fluid passage and fixed onto the collar by means of screws 34, in order to define with the collar part of a fluid-tight chamber K, into which an end of the tubular body 27 opens.

Referring to FIG. 4, the heater 26 is fluidly connected to an inlet of the fluid outlet duct 15 by means of a fluidic connection device 43 constructively identical to the fluidic connection device 31.

With reference to FIGS. 2 and 4, the heaters 25 and 26 are mutually connected by means of a fluidic connection assembly 35, which comprises, a fluidic connection device 37 associated with the tubular body 27, a fluidic connection device 38 associated with the tubular body 28, and a piping 39 connecting the fluidic connection devices 37 and 38.

Figure 5:
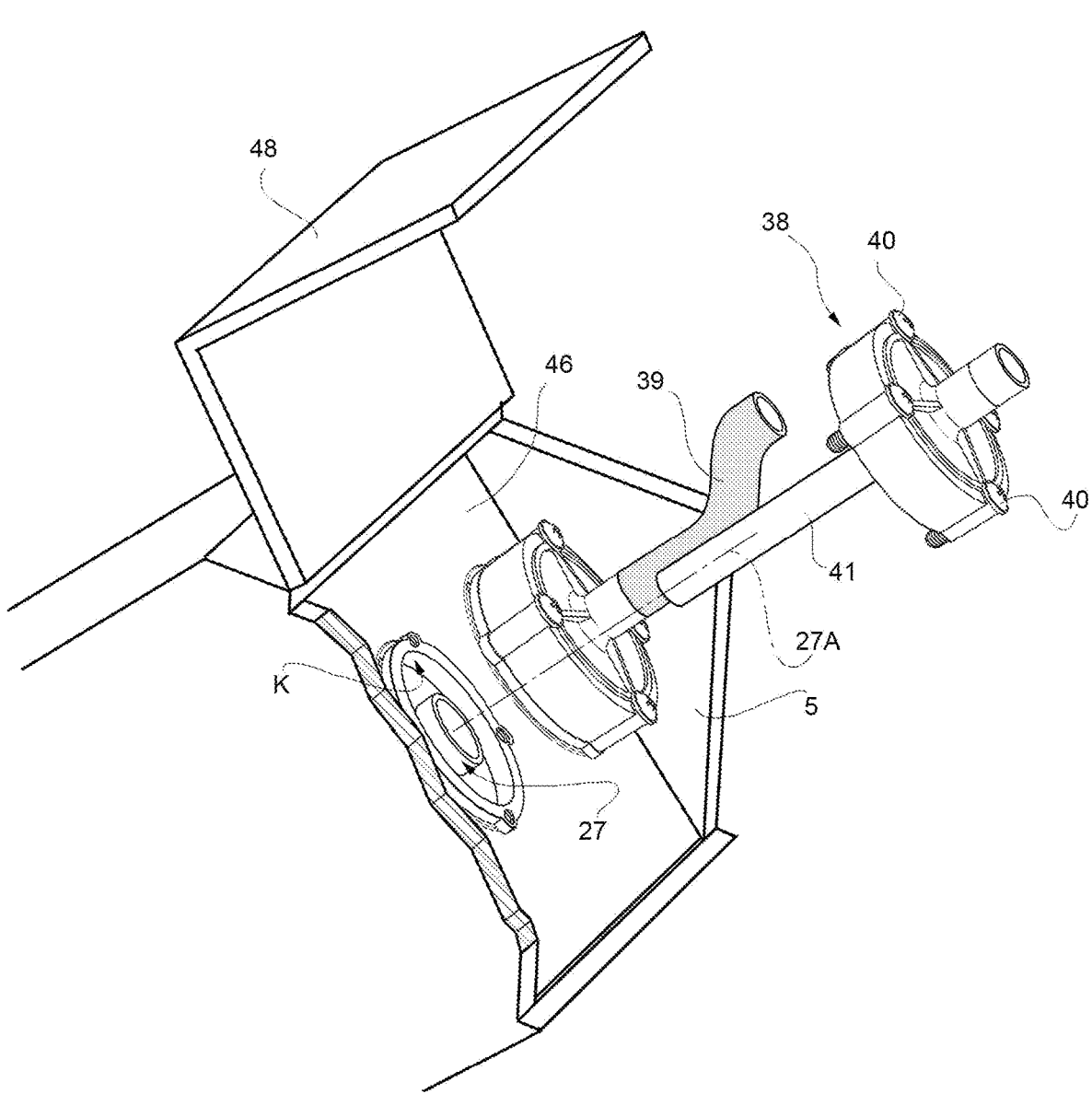
FIG. 5 shows a portion of the automatic beverage preparation machine shown in FIG. 2 in a partially disassembled maintenance configuration.

Conveniently, the fluidic connection devices 37 and 38 are constructively identical or similar to the device 31 and comprise respective collars 37A and 38A and respective plugs 37B and 38B, which define respective fluid passages and are fixed onto the respective collars 37A and 37B by means of screws 40 to delimit with the same collars part of respective fluid-tight chambers K, into which free ends of the tubular bodies 27, 28 open and protrude (FIGS. 3,4 and 5).

Conveniently, each plug 37B, 38B stably carries a longitudinal insert 41, in jargon known as an "auger", which extends inside the respective tubular body 27, 28 and is configured to guide the fluid to be heated through a predefined curved or twisting path.

In a variant not shown, the plugs 37B and 38B are deprived of the inserts 41, and the fluid flows longitudinally through the tubular bodies 27, 28 along the axes 27A and 28A.

Again with reference to FIGS. 3, 4 and 5, the fluidic connection assembly 35 extends outside a fixed side wall 46 of the casing 2. The wall 46 is arranged adjacent to the upper wall 4, above the recess 7 and the fluid dispensing nozzle 10, and is provided with a pair of openings 45 which put the inside of the casing in communication with the outside.

In the example described, the tubular bodies 27 and 28 extend inside the casing 2 from the wall 46, while the collars 37A and 38A protrude from the wall 46.

In the example described, the collars 37A and 38A, and the corresponding plugs 37B and 38B and the piping 39, are hence arranged completely outside the casing 2. And they are housed inside a 47 chamber (FIG. 2).

The chamber 47 has a back wall defined by the side wall 46 and is closed by a shaped hatch 48. Conveniently, the hatch 48 is hinged to the upper wall 4 to rotate about a hinge axis 49 between a closed position, in which is closes the chamber 47, shown in FIG. 1, and an open position, shown in FIG. 2.

During beverage dispensing, the hatch 48 is held in the closed position, thus isolating the fluidic connection assembly 35 from the outside. When, on the other hand, the heaters 25 and 26 have to be subjected to maintenance, the hatch 48 is moved to the open position, the screws 40 are removed, so releasing the plugs 37B, 38B and the collars from the casing 2. At this point, decoupling or not the piping 39 from at least one of the plugs 37B, 38B, as shown in FIG. 5, the plugs 37A and 38A are extracted along with the associated inserts 41, when provided, leaving the accesses to the inside of the tubular bodies 27 and 28 visible (FIG. 5).

In these conditions it is easy for an operator assigned to cleaning operations to insert a pipe cleaner into the tubular bodies 27 and 28 and clean them. After cleaning, the plugs 37B and 38B are repositioned and screwed back on, the piping 39 is reconnected, the hatch 48 is closed and the automatic beverage preparation machine 1 is again ready for operation.

It is clear from the foregoing that the possibility of accessing inside the tubular bodies 27, 28 directly from the outside without having to dismantle parts of the casing 2 and keeping the automatic beverage preparation machine stationary in the same operating position greatly simplifies cleaning and maintenance operations, on the one hand, and considerably reduces intervention times, on the other. In particular, all the cleaning operations to remove the limescale are facilitated.

In addition to this, maintenance does not require operating spaces other than that required for normal machine operation, and the environment around the automatic beverage preparation machine 1 is not polluted by leakage of liquids or other substances, which in some cases can occur even only if the machine is tilted.

The special design and control of the heaters 25 and 26 allows precise and gradual control of the temperature of the fluid to be heated so as to avoid temperature fluctuations and thus ensure optimum treatment regardless of the fluid being treated and, in particular, in the presence of sensitive liquids.

It is clear from the above that modifications and variations can be made to the automatic beverage preparation machine 1 described without going beyond the scope of protection defined by the independent claim.

In particular, the fluidic connection devices 37 and 38 could be made differently than what is described. In particular, the plugs 37B and 38B and the associated collars 37A and 38A could be made in a manner other than that indicated by way of example, be mutually connected and to the casing 2 in a manner other than that indicated and, for example, by means of quick coupling and release devices, such as, for example, bayonet or snap-on devices.

Not only that, the fluidic connection devices 37 and 38 could not be arranged completely outside the casing 2, but extend at least partially inside the casing 2 through the openings 45 or even be arranged inside the casing 2 and the openings 45 be configured to allow access to the casing 2 and allow the removal of the plugs 37B and 38B from the outside so as to make the direct access from the outside to the tubular bodies 27, 28 free without having to disassemble the casing.

The openings 45 may not be separate but parts of a single opening.

Similarly, and irrespective of the embodiment, the fluidic connection assembly 35 and the plugs 37B and 38B could be arranged in a different area of the casing 2 than that indicated by way of example with respect to the dispensing nozzle 10 and, for example, be arranged in outer recesses of the side walls 5 or even of a rear wall of the automatic beverage preparation machine 1.

In a preferred embodiment, the heaters 25 and 26 may be arranged in positions such that the fluidic connection device 43 is also accessible from the outside through an access opening formed through the casing 2. Conveniently, the two access openings of the fluidic connection devices 31 and 43 are opposite and placed one above and one below the heaters 25 and 26.

Furthermore, chamber 47 could be closed by a hatch other than the one indicated as an example or even be an open chamber, in which case the hatch 48 could be absent.

Finally, it is clear from the foregoing that the heating device 14 could comprise only one heater and, for example, only the heater 25. In this case, the fluid outlet circuit 15 extends from the fluidic connection device 37.

The invention claimed is:

1. An automatic beverage preparation machine operable to prepare and dispense a beverage in a container, the automatic beverage preparation machine comprising:
   a casing;
   a support for the container;
   a beverage preparation assembly operable to prepare and dispense a beverage in the container,
   wherein the beverage preparation assembly comprises a fluid supply circuit operable to supply a fluid to be heated for preparing the beverage, a fluid outlet circuit to supply a heated fluid, and at least one electromagnetic-induction, continuous-flow heater fluidly connected to the fluid supply circuit and to the fluid outlet circuit,
   wherein the electromagnetic-induction, continuous-flow heater comprises a tubular body in fluid communication with the fluid supply circuit and the fluid outlet circuit and delimiting a path for a flow of the fluid to be heated,
   wherein the fluid outlet circuit comprises a fluid connection arranged between an end portion of the tubular body and the fluid outlet circuit,
   wherein the fluid connection delimits a chamber into which the end portion of the tubular body opens and comprises a plug-shaped body to close the chamber and is configured to define a fluid passage in communication with the chamber;
   a releasable connector to retain the plug-shaped body; and
   an electric winding electrically powerable to generate an electromagnetic induction field to heat fluid flowing in the tubular body,
   wherein the casing has an opening that communicates an inside of the casing with an outside of the casing, and
   wherein the releasable connector is removable by acting from outside of the casing.

2. The automatic beverage preparation machine of claim 1,
   wherein the tubular body has a longitudinal axis passing through the plug-shaped body, and
   wherein the longitudinal axis passes through the opening.

3. The automatic beverage preparation machine of claim 1, further comprising:
   a hatch coupled to the casing and movable between a closed position, in which the plug-shaped body is prevented from being accessed, and an open position, in which uncoupling and removal of the plug-shaped body and direct access to the fluid passage is allowed.

4. The automatic beverage preparation machine of claim 1, wherein the opening is formed in a wall of the casing arranged above the support.

5. The automatic beverage preparation machine of claim 1, further comprising:
   a dispensing nozzle arranged outside of the casing to dispense a beverage in the container,
   wherein the opening is formed over the dispensing nozzle.

6. The automatic beverage preparation machine of claim 2, wherein the support comprises a resting surface for the container and the longitudinal axis is tilted with respect to the resting surface.

7. The automatic beverage preparation machine of claim 1, further comprising:
   a second electromagnetic-induction, continuous-flow heater series-connected to the electromagnetic-induction, continuous-flow heater, wherein the second electromagnetic-induction, continuous-flow heater comprises a second tubular body delimiting a second path for the flow of the fluid to be heated;

a second fluid connection arranged between the first and second electromagnetic-induction, continuous-flow heaters, wherein the second fluid connection delimits a second chamber in which an end segment of the second tubular body opens and comprises a second plug-shaped body to close the chamber and is configured to delimit a second fluid passage in communication with the second chamber;

a second releasable connector that enables removal of the second plug-shaped body;

a second electrically powerable electric winding that generates an electromagnetic-induction field to heat a fluid flowing in the second tubular body, and wherein the releasable connector is removable by acting from outside of the casing.

8. The automatic beverage preparation machine of claim 7, wherein the fluid connection comprises a fluid connection piping to connect the chamber to the further chamber, and wherein the piping extends at least partially outside of the casing and is configured to be separated from at least one of the chambers.

9. The automatic beverage preparation machine of claim 7, wherein at least one of the tubular bodies houses a guide member to guide the fluid flow along a curved path during heating, and wherein the guide member is firmly connected to the associated plug-shaped body and is extractable through the associated opening.

10. The automatic beverage preparation machine of claim 7, wherein the plug-shaped bodies are arranged side by side.

11. The automatic beverage preparation machine of claim 1, wherein the electric windings are operatively independent and selectively electrically powerable to heat the fluid flowing along the respective paths at different temperatures.

* * * * *